United States Patent

Kroeger

[15] 3,686,440

[45] Aug. 22, 1972

[54] TELEPHONE CALLING-STATION IDENTIFICATION

[72] Inventor: James K. Kroeger, Newark, N.J.

[73] Assignee: Sola Basic Industries, Inc., Milwaukee, Wis.

[22] Filed: March 26, 1971

[21] Appl. No.: 128,448

[52] U.S. Cl. ..........179/5.5, 179/18 FH, 179/27 DB, 179/84 VF, 179/90 AN

[51] Int. Cl. ..........H04m 15/06

[58] Field of Search ..179/5.5, 84 VF, 18 FH, 27 DB, 179/27 FC, 27 FF, 90 AN; 340/336

[56] References Cited

UNITED STATES PATENTS

| | | | |
|---|---|---|---|
| 3,133,153 | 5/1964 | Bonanno | 179/27 FF |
| 3,576,951 | 5/1971 | Uchida | 179/27 DB |
| 2,040,646 | 5/1936 | Erickson | 179/90 AN |
| 3,582,554 | 6/1971 | LeBlang | 179/84 VF |

FOREIGN PATENTS OR APPLICATIONS

| | | | |
|---|---|---|---|
| 1,170,331 | 11/1969 | Great Britain | 179/5.5 |

*Primary Examiner*—Kathleen H. Claffy
*Assistant Examiner*—David L. Stewart
*Attorney*—Charles T. Jacobs

[57] ABSTRACT

Station-identification apparatus for use in reception of telephone calls from stations at each of which there is repetitively superimposed on the call therefrom a respective series, peculiar to that station, of numeral-representing signals. The received signals are screened in various respects, and the numerals represented by a series thereof are sequentially stored. Output means are actuated to read out the stored signals under conditions which minimize the risk of erroneous read-out.

7 Claims, 2 Drawing Figures

INVENTOR
JAMES K. KROEGER
BY
ATTORNEY

PATENTED AUG 22 1972

3,686,440

INVENTOR
JAMES K. KROEGER
BY [signature]
ATTORNEY

TELEPHONE CALLING-STATION IDENTIFICATION

This invention relates to the reception of telephone calls, and more particularly to the identification, at the point of reception, of the stations from which calls are received. While not in all aspects limited thereto, it has particular utility in the reception of emergency calls, since they involve a much higher-than-usual likelihood that a correct identification will not be made orally.

The invention postulates that during a call from any one of the calling stations which are to be identified there will be repetitively superimposed on the call a respective series, peculiar to that station, of a uniform number $n$ of numeral-representing spaced signals, each series extending over a predetermined period of time, and the interval of recurrence of the series being long relative to that period. It is an object of the invention to provide, at the point of reception, calling-station identification apparatus responsive to such superimposed series. It is an object to provide such identification apparatus by which the risk of erroneous identification is minimized. Allied and other objects appear hereinafter.

The invention contemplates the use, in the reception of the calls, of means for receiving and screening such signals, and a group of $n$ storing means for sequentially storing the numerals respectively represented by successive received and screened signals. Output means are provided, and between them and the storing means there are interposed means actuable to cause the output means to read out the signals then standing stored in the storing means; an actuation command is delivered to the actuable means when a received and screened signal has been followed by ($n$−1) received and screened signals within a time span much shorter than the interval of recurrence abovementioned. The actuable means may include a group of $n$ storing means respectively connected with the $n$ storing means of the first group and effective, when the actuable means is actuated, to store the numerals then standing stored in the storing means of the first group. There may additionally be provided means, effective after the first actuation of the actuable means following a period of quiescence, for inhibiting the further actuation thereof so long as the numerals respectively stored in the storing means of the first group remain constant. Other features and characteristics of the invention will appear from the following detailed description.

Figure 1:
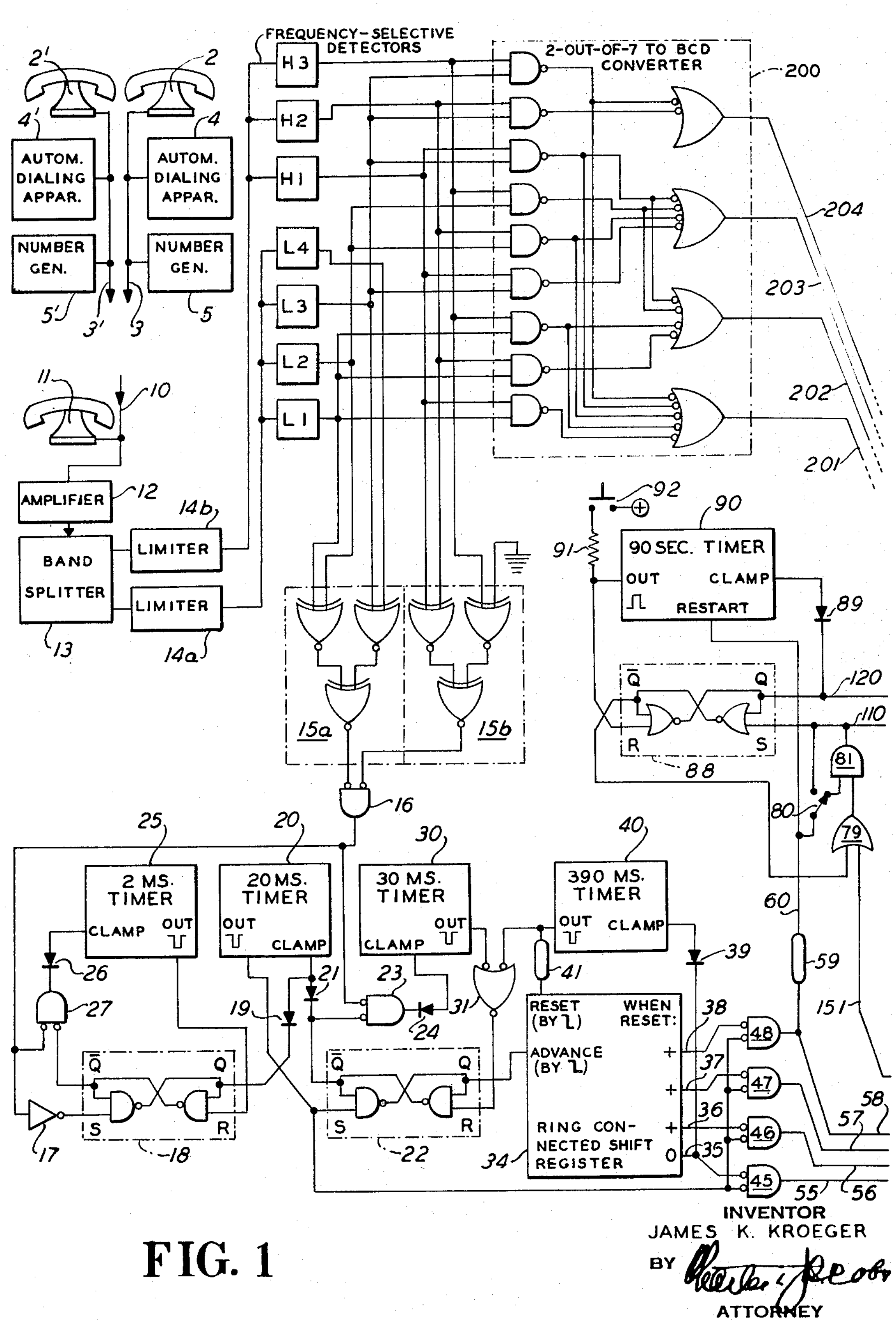
Figure 2:
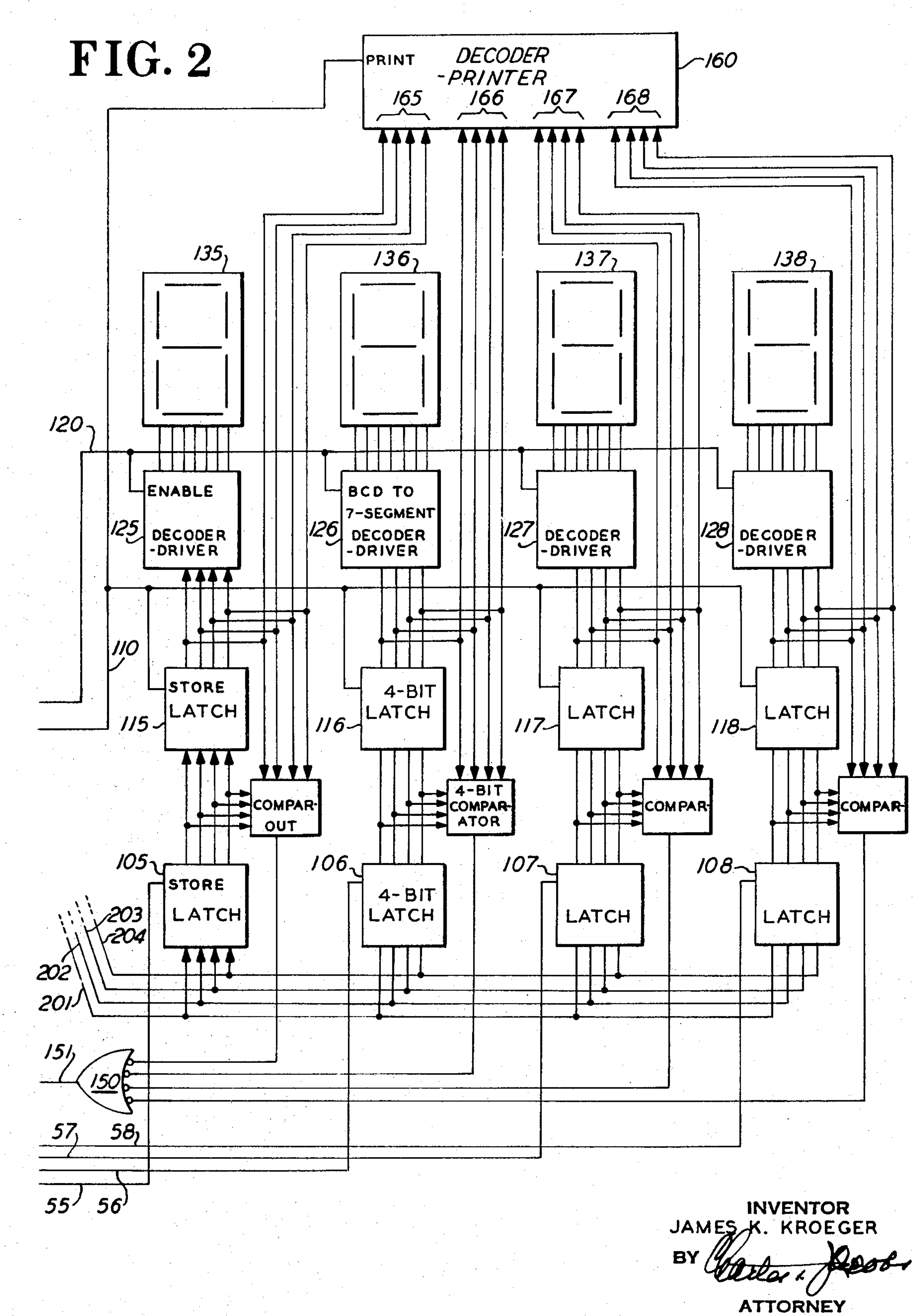

In that description reference is had to the accompanying drawings in which FIGS. 1 and 2, taken together, constitute a schematic diagram of a typical embodiment of the invention.

In FIG. 1 the numeral 11 denotes a telephone station at which emergency calls are to be received; it may be connected to an exchange in the conventional manner by a line 10, and will be reached from other stations by the dialing of the conventional (typically seven-digit) number assigned to it.

A remote telephone station, situated at a location from which it may be desired to make emergency calls, is shown as 2, and a line connecting it to the exchange as 3. Desirably station 2 is provided with automatic dialing apparatus 4 programmed for the dialing of station 11. Further it is provided with a number generator 5 which, after communication with station 11 has been established, is repetitively operated — for example every 10 seconds — during such communication to repetitively superimpose on line 3 and thus on the call a coded number peculiar to station 2. That number may be in the form of a series of several — for example four — numeral-representing predeterminedly spaced signals extending over a predetermined period of time; each signal may for example be of dual frequency, for example in a two-out-of-seven code which corresponds to (though it need not precisely duplicate frequency wise) that commonly used for pushbutton dialing, in which each of 10 numerals is represented by a respective combination of one low- and one high-frequency component. Each signal may typically be of about 50 milliseconds duration, as may also each inter-signal interval; thus the series of four signals may extend over a predetermined period of about 350 milliseconds, relative to which the typical 10-second interval of recurrence is long.

Elements 2′, 3′, 4′ and 5′ may be corresponding components for another remote station; still additional remote stations, up to a limit imposed by the number of numerals in each coded number, may of course be served as well.

At station 11 there is located apparatus which, while any one of the remote stations is in communication with station 11, will detect and decode the number-representing signals which are being repetitively superimposed at that remote station, thereby to provide at station 11 an identification of that remote station. It is this apparatus which is illustrated in the rest of FIG. 1 and in FIG. 2.

In accordance with the practice followed during dialing in exchanges equipped to serve pushbutton-dialing phones, the oscillations present on the line 10 — which may comprise voice- or other sound-representing oscillations as well as the number-representing signals — are impressed on the high-impedance input of an amplifier 12, the output of that amplifier is passed to a band-splitter 13 having a low-frequency and a high-frequency output, and each of the latter outputs is in turn passed through a respective limiter **14*a* or 14*b* to a respective group of frequency -selective detectors, shown as L1 through L4 for the low-frequency output and as H1 through H3 for the high-frequency output. In accordance with that practice these circuit components are readily selected and arranged so that the detector outputs, which for example are quiescently at O-state, will not change state (other than in very brief transients) in response to ordinary sound-representing oscillations which are likely to be present on the line 10**; on the other hand the presence on that line of any one of the ten predetermined combinations of one low- and one high-frequency signal component will result in a 1-state at the output of one of the detectors L1 through L4, and in a 1-state at the output of one of the detectors H1 through H3 — the collective identities of those two detectors expressing the numeral represented by that combination.

In the illustrated apparatus the outputs of the detectors L1 through L4 and H1 through H3 are connected to the inputs of a two-out-of-seven to binary-coded-decimal (BCD) converter 200, to whose conventional four outputs conductors 201, 202, 203 and 204 are respectively connected. Thus the respective states of those four conductors occasioned by any numeral-representing signal received by the apparatus will express in BCD code the numeral represented by that signal.

It is of course possible for outputs from the detectors L1 through L4 and H1 through H3 to result from non-signal phenomena as well as from numeral-representing signals, and it is accordingly desirable to process that output so as to screen those signals from the conglomeration of them with any such spurious phenomena. One step in such screening is the known step of verifying that during the apparent signal there is a 1-state at the output of one and only one of the low-frequency detectors L1 through L4, and a 1-state at the output of one and only one of the high-frequency detectors H1 through H3. In the illustrated apparatus this step is achieved by respectively connecting the four low-frequency detector outputs to the four inputs of a four-bit parity tree 15*a*, and the three high-frequency detector outputs to three of the four inputs of another four-bit parity tree 15*b* (the fourth input of which may be held at 0-state). The outputs of the two trees may be respectively connected to the two inputs of a negative-logic-input AND gate 16; then the presence at the output of gate 16, which will quiescently be at 0-state, of a 1-state will accomplish this verification.

It is convenient at this juncture to describe the elements in the lower portion of FIG. 1. They include four timers 20, 25, 30 and 40, which may typically have respective timing periods of 20, 2, 30 and 390 milliseconds. Each may have a clamp terminal which is quiescently clamped to 0-state to hold the timer inoperative but prepared for operation, and whose declamping will result in a start of the timing operation; if that operation proceeds for the full timing period of the timer, then at its conclusion the timer will deliver an output pulse. By way of example the output terminal of each timer may be quiescently at a 1-state, and the output pulse may be of 0-state.

With the first three of these timers there are employed two flip-flops, 18 and 22. The clamp terminal of timer 20 may be connected through a diode 19 to the Q terminal of flip-flop 18 and through a diode 21 to the $\bar{Q}$ terminal of flip-flop 22; the clamp terminal of timer 25 may be connected through a diode 26 to the output of a negative-logic-input AND gate 27 whose inputs are respectively connected to the output of gate 16 and to the $\bar{Q}$ terminal of flip-flop 18; and the clamp terminal of timer 30 may be connected through a diode 24 to the output of a similar AND gate 23 whose inputs are respectively connected to the output of gate 16 and to the $\bar{Q}$ terminal of flip-flop 22. The output of timer 20 may be connected to the set terminal of flip-flop 22; the output of timer 25 may be connected to the reset terminal of flip-flop 18; and the output of timer 30 may connected to one of the inputs of a negative-logic-input NOR gate 31 whose output is connected inter alia to the reset terminal of flip-flop 22. An inverter 17 may be connected from the output of gate 16 to the set terminal of flip-flop 18.

The elements in the lower portion of FIG. 1 further include a ring-connected shift register 34 having a number of outputs equal to the number of numerals in each number-representing series — e.g. four outputs, respectively identified as 35, 36, 37 and 38. It may be provided with a reset terminal and be resettable by the application of a negative-going wavefront to that terminal; when the register is reset its output 35 may be at 0-state and its other three outputs each at 1-state. It may further be provided with an advance terminal to which the application of a negative-going wavefront will cause a shift of the 0-state upwardly by one in the series of outputs or, in a shift from output 38, a shift to output 35 — all outputs other than the one which at any time is at 0-state being then at 1-state, and the states being uniquely returned to those illustrated upon any resetting of the register. The clamp terminal of the timer 40 may be connected through a diode 39 to the shift-register output 35; the output of that timer may be connected to the second input of gate 31 and, through a short-interval delay element 41, to the reset terminal of the shift register 34.

Those elements may further include four negative-logic-input AND gates 45, 46, 47 and 48 to whose outputs conductors 55, 56, 57 and 58 may be respectively connected. The lower inputs of those gates may in common be connected to the output of timer 20, while their upper inputs are respectively connected to the outputs 35, 36, 37 and 38 of the shift register 34.

The timers 20 and 25 and flip-flop 18 act to cause an output pulse from timer 20 to occur when a numeral-representing signal has persisted for at least a predetermined duration, typically 20 milliseconds, without interruption for more than a much shorter predetermined interval, typically 2 milliseconds. Thus the 1-state at the output of gate 16, which verified the composition of the signal and which will persist so long as that signal persists, will have produced a 0-state at the set terminal of, and will therefore have set, flip-flop 18 — which is destined to remain set until (a) a cessation of the signal has raised the output of gate 27 to 1-state and has thereby declamped and started timer 25, and (b) that cessation has persisted for a 2-millisecond interval, permitting that timer to complete its operation and to yield a 0-state output pulse to reset flip-flop 18.

Meanwhile, however, the setting of 18 will also have declamped and started the operation of timer 20, and if that timer completes a 20-millisecond operation before the occurrence of any 2-millisecond interruption of signal it will yield an output pulse; it may be noted that this output pulse from 20 occurs while the signal is still continuing (and thus while flip-flop 18 remains set, and thus prior to the output pulse from timer 25). On the other hand if before timer 20 completes its operation there has occurred an interruption of the signal for as long as 2 milliseconds, with a consequent resetting of flip-flop 18, then the timer 20 will be reclamped without having yielded an output pulse — and any such pulse from that timer based on that signal can occur only if thereafter the signal persists for a fresh 20-milliseconds without the occurrence of any 2 millisecond interruption.

The timer 30 and flip-flop 22 act to cause an output pulse from timer 30 to occur when a predetermined interval, typically 30 milliseconds, has passed since the conclusion of a signal. Thus when during a signal there occurs the above-described output pulse from timer 20, one of the effects of that pulse is to set flip-flop 22, which while set clamps timer 20 through diode 21 independently of the state of flip-flop 18. The setting of 22 places at 0-state the lower input of, and thus enables, gate 23; when that gate's upper input goes to 0-state as an incident to subsequent cessation of the signal, its output will assume a 1-state, declamping and thus starting operation of the timer 30 — and if no new signal appears during its 30-millisecond timing period, timer 30 at the conclusion of that period will yield a 0-state output pulse. This pulse is fed to gate 31, and the resulting 0-state output pulse from that gate is fed to the reset terminal of flip-flop 22 to reset the latter. On the other hand if a signal does appear before timer 30 completes its operation, the resulting 1-state at the output of gate 16 and at the upper input of gate 23 will cause the output of the latter to assume 0-state; this will reclamp the timer 30 in inoperative condition, and there will be no output pulse from it based on the preceding signal.

An important effect of the output pulse from timer 30 is, through the resulting resetting of flip-flop 22, to apply a negative-going wavefront from the Q terminal of that flip-flop to the advance terminal of the shift register 34, which will thereupon advance the 0-state among its outputs.

During a proper series of normally received and screened numeral-representing signals the actions described in the preceding three paragraphs will take place during and following each of those signals — the distinction in those actions as between those signals being that during (and until some 30 milliseconds after) the first the shift register output which will be at 0-state will be 35, during (and until 30 milliseconds after) the second it will be 36, and so on. Thus throughout the initial signal there will be enabled the gate 45, during the second the gate 46, and so on; accordingly when the output pulse from timer 20 occurs during the first signal a 1-state pulse will occur on conductor 55, when such an output pulse occurs during the second signal a 1-state pulse will occur on conductor 56, and so on.

As hereinafter appears, the effect of each of the last-mentioned pulses is to invoke a storage of the numeral expressed by the then-existing states of the four conductors 201, 202, 203 and 204. The occurrence of one of those pulses during any signal depends on the occurrence during that signal of an output pulse from timer 20; thus the elements 18, 20 and 25, by their action described in the fourth preceding paragraph, serve to withhold from storage any signal which has not persisted for at least the predetermined duration without interruption for more than the much shorter interval. Furthermore the occurrence of one of those pulses during a non-initial signal depends on the shift register 34 having been advanced, by an output pulse from timer 30, subsequently to the preceding signal; thus the elements 30 and 22, by their actions described in the third preceding paragraph, serve to withhold from storage any non-initial signal not preceded by a non-signal interval at least equal to the typical 30-millisecond interval — which is a substantial fraction of the predetermined inter-signal spacing, typically of 50 milliseconds.

For read-out purposes hereinafter dealt with there is required the delivery of an actuation command, typically a 1-state pulse, to a destination hereinafter specified. Means for delivering it may comprise a conductor 60 connected to the output of the final one (48) of the group of gates 45 through 48, preferably through a delay device 59 providing for a delay typically of the order of a few tens of microseconds; the delivery of the command will then of course take place minutely after that output pulse from timer 20 which occurs while the shift-register output 38 is at 0-state. It is, however, highly desirable that the delivery of the actuation command be limited to occurrence only when a series of received and screened signals has been completed, following the first signal of the series, within a time span much shorter than the interval (typically 10 seconds) of recurrence of the repetitive superimposition on the call — for example, within a time span of the order of magnitude of the abovementioned predetermined period (typically 350 milliseconds) over which each series of superimposed signals extends. Stated in terms of a series of $n$ signals, the command may be limited to occurrence when a received and screened signal has been followed by ($n$—1) received and screened signals within such a time span. This limitation avoids improper readouts which may otherwise occur due to loss of one or more signals of a normal series of $n$ signals — whether by reason of malfunction of the superimposing means at the remote station, interference, start of reception while a series is already in progress, or otherwise.

The timer 40, typically with a 390 millisecond timing period, is active in effecting the limitation just described. It will be declamped and its operation thus started when the shift-register output 35 ceases to be at 0-state; taking the conclusion of the first received and screened signal as a reference instant, the timer's operation will begin at some 30 milliseconds, and will extend to some 420 milliseconds, thereafter. If the series of received and screened signals be complete, the first of them will have been followed by three more which will have been concluded at some 300 milliseconds following the reference instant, and in another 30 milliseconds the shift register will have been returned to reset condition; this will forthwith reclamp the timer and stop its operation. On the other hand if the first of the received and screened signals be not followed by three more prior to some 420 milliseconds from the reference instant — i.e. within a time span such as referred to in the preceding paragraph — then at the conclusion of that time span the timer will deliver an output pulse; this will be applied through the delay element 41 to the reset terminal of the shift register, resetting that register and foreclosing the delivery of any actuation command on the conductor 60 as an incident to that series of received and screened signals.

It may be noted that the output pulse from timer 40 will cause a 0-state output pulse to pass from gate 31 to the reset terminal of flip-flop 22, insuring that that flip-flop will be left in reset condition. It may further be noted that the application of that pulse to the reset terminal of the shift register through the delay element 41 provides for a delay sufficient to insure that the register-reset action will survive any advancing action which might compete with it as a result of the resetting of the flip-flop 22.

FIG. 2 shows the means for effecting the storage above referred to, in the form of four i.e., $n$) four-bit latches 105, 106, 107 and 108. Each has at its bottom four inputs respectively connected to the conductors 201, 202, 203 and 204 abovementioned and has at its top respectively corresponding outputs; each has a store-command terminal, that for 105 being connected to conductor 55, that for 106 being connected to conductor 56, and so on. Upon the application of a 1-state pulse to the store-command terminal of any of these latches its several outputs will assume the states then present at the respectively corresponding inputs; those states those outputs will maintain until another pulse is applied to the store-command terminal subsequent to some change in state of one or more of the inputs, for which reason the latches are referred to as last-in storing means. It will accordingly be understood that, during a series of $n$ received and screened numeral-representing signals, the numeral represented by the first signal will first be stored in BCD form at the outputs of latch 105, that represented by the second signal will subsequently be stored at the outputs of latch 106, that represented by the third signal will still subsequently be stored at the outputs of latch 107, and that represented by the fourth signal will finally be stored at the outputs of 108.

Typical output means, for reading out the numerals stored in the storing means, may next be described. These may be four (i.e., $n$) seven-segment display tubes, illustrated as 135 through 138 in FIG. 2. The seven input terminals of each of these tubes are connected respectively to the seven output terminals of a respective decoder-driver; the four decoder-drivers, 125 through 128, appear in FIG. 2 below the respective tubes.

Each of the decoder-drivers of course has four BCD input terminals; it also has a respective enable terminal, all four enable terminals being connected to a common conductor 120. When that conductor is a 1-state all four decoder-drivers will be enabled, and the numerals respectively present in BCD form at their inputs will be displayed by illumination of appropriate ones of the segments of the respective tubes 135 through 138; when that conductor is a 0-state the decoder-drivers will be disabled and the tubes will be unilluminated. Suitable control of the state of conductor 120 is dealt with below.

It is possible to operate the apparatus with the input terminals of each decoder-driver connected to the respective output terminals of the respective storing means (i.e. latch 105, 106, 107 or 108 as the case may be); the decoder-drivers could then be viewed as means, interposed between the storing means and the output means, actuable — by the enablement of the decoder-drivers — to cause the output means to read out the numerals then standing stored in the storing means. There are, however, advantages to be achieved by interposing between storing and output means — by way of specific example, between each storing means and the respective decoder-driver — other means actuable in a different manner for that purpose, the enablement of the decoder-drivers then becoming an auxiliary or incidental, rather than a primary, control function.

Such other means may be a second group of four (i.e., $n$) last-in storing means in the form of latches 115 through 118, for example of similar nature to the latches of the first group, each having its inputs respectively connected to the outputs of the respective first-group latch and having its outputs respectively connected to the inputs of the respective decoder-driver. The store-command terminals of all the latches of the second group may be connected to a common conductor 110 — which will then be the destination to which the actuation command above referred to is to be delivered. Apparatus for such delivery, as well as for appropriate control of the state of conductor 120, is illustrated in the right central portion of FIG. 1.

Therein it will be seen that the conductor 60 is connected to the blade of a switch 80; it will first be assumed that this blade is in vertical position, and that elements 79, 81, 89 and 90 are absent. With the blade in that vertical position the conductor 60 is connected both to the conductor 110 and to the set terminal of a flip-flop 88; the conductor 120 may be connected to the Q terminal of that flip-flop, whose reset terminal may be connected (for example through a resistor 91) to a normally open pushbutton switch 92 which when closed will connect it to a source of 1-state potential. A momentary closure of the switch 92 during a period of quiescence will insure the flip-flop 88 being in reset condition, its Q terminal being at 0-state, the decoder-drivers 125 through 128 being disabled and the tubes 135 through 138 unilluminated.

When the next 1-state pulse appears on conductor 60 — i.e. just after the storing in latch 108 of the numeral represented by the $n$th signal of the next-received normal series — not only will it set the flip-flop 88 thereby enabling the decoder-drivers via conductor 120, but also it will appear on conductor 110; this will actuate the storing means of the second group 115 through 118 to reproduce in BCD form at their several outputs the numerals then standing stored at the corresponding outputs of the storing means of the first group 105 through 108, and thereby to cause the tubes 135 through 138 to read out those numerals.

As above noted, it is contemplated that the superimposition, at any of the remote stations, of the series of signals which identifies that station will be repetitive (e.g. at 10-second intervals) throughout a call from that station. So long as each series received from that station following the first be a complete one of $n$signals normally received and screened, there will be no change in the outputs of the latches of the first group — but otherwise there may indeed be such a change during the interval until the resumption of normally received and screened signals. In the absence of the second group of storing means 115 through 118 such a change would result in the display by the tubes 135 through 138 of spurious information during that interval — a disadvantage obviated by the inclusion of that second group, for all practical purposes other than certain malfunctions at the remote station.

With the apparatus as thus far described there is the disadvantage that the tubes 135 through 138 will continue to display the numerals identifying the remote station from which a call has last reached the station 11, no matter whether that call still be in progress or how long a time may have elapsed since its conclusion — unless the attendant following such conclusion has taken the trouble momentarily to close the pushbutton switch 92 and thereby to reset the flip-flop 88. This disadvantage may be obviated by the inclusion of the timer 90. This may have a timing period long relative to the interval of recurrence of the series of signals — e.g. it may have a timing period of the order of 90 seconds — and may basically be of nature similar to that of the timers above referred to; it may, however, differ (a) in that its output may quiescently be at 0-state, yielding a 1-state pulse at the conclusion of the timing period, and (b) in that it may be provided with a restart terminal to which the application of a positive-going wavefront, while the timer is declamped and in operation, will restart its timing period (to result in operation as though the timer had only then been declamped). The clamp terminal of the timer may be connected to the Q terminal of flip-flop 88 through a diode 89, the timer's output terminal may be connected to the reset terminal of the flip-flop, and its restart terminal may be connected to the conductor 60.

For any call the timing period of the timer 90 will be started by the first pulse on conductor 60, and will be restarted by each succeeding such pulse, during that call — but following the last such pulse the timing period will proceed to normal conclusion, whereupon an output pulse from the timer will reset the flip-flop, disable the decoder-drivers and extinguish the tubes 135 through 138. That extinguishment will last through the interval until a conductor-60 pulse is evoked by a succeeding call.

An output means additional or alternative to the tubes 135 through 138 may for example be a decoder-printer 160 having a respective group of BCD inputs (165, 166, 167, 168) for each of the *n* numerals of a series; the inputs of each group may be respectively connected as are the inputs of the decoder-drivers 125 through 128. The decoder-printer will also have a print terminal to which the application of a 1-state pulse will cause the decoder-printer to print out the number constituted by the series of numerals which are then applied to those decoder-printer inputs.

While the decoder-printer's print terminal may be and is shown as connected to the conductor 110, it is clear that there will then be undesirable the sustainedly repetitive applications of pulses to that terminal as described above; most of those applications would cause the printing operation to recur altogether needlessly, occasioning wear and useless output. What is desirable and sufficient is an application of a pulse to that conductor when a pulse appears on conductor 60 following (a) a period of quiescence of the system, or (b) a change of one or more of the numerals respectively stored at the outputs of the first-group latches 105 through 108 (which change is destined upon that pulse to occur at the outputs of the corresponding second-group latch or latches). Stated in other terms, it is desirable that there be means, effective after the first actuation of the means which invokes the read-out, for inhibiting the further actuation of that means so long as the numerals respectively stored in the *n* storing means of the first group remain constant.

Arrangements for that purpose are illustrated. In their use the blade of switch 80 will be positioned as illustrated in FIG. 1; it then connects conductor 60 to one of the two positive-logic inputs of an AND gate 81, whose output is connected to the conductor 110 and to the set terminal of flip-flop 88. To the other input of gate 81 there is connected the output of an OR gate 79, one of the positive-logic inputs of which is connected to the $\overline{Q}$ terminal of flip-flop 88. During a period of quiescense that terminal, and thus the output of gate 79, will be at 1-state and the gate 81 will therefore be enabled; thus a pulse on conductor 60 at the conclusion of such a period will result in the intended application of a pulse to conductor 110.

Means for the detection of the condition (b) mentioned in the second preceding paragraph are illustrated in FIG. 2. Thus to the outputs of each of the latches of the second group 115 through 118 there may be connected one group of inputs of a respective four-bit comparator, of which a second group of inputs is appropriately connected to the outputs of the corresponding one of the latches of the first group 105 through 108; these comparators are shown as 145 through 148. Each comparator may have an output terminal which is normally at 1-state, but which assumes 0-state when these is disagreement of state between any one of its first group of inputs and the corresponding one of its second group of inputs. The output terminal of each comparator may be connected to a respective one of the negative-logic inputs of an OR gate 150; to the output of that gate, normally at 0-state, there may be connected a conductor 151.

During the interval beginning with a change of numeral at the output of any first-group latch and ending with the pulse on conductor 110 which will cause the same change to occur at the output of the corresponding second-group latch, the conductor 151 will be placed at 1-state. (The delay element 59 insures the existence of such an interval even for the case of the latch 108.) The conductor 151 may be connected (see FIG. 1) to the second input terminal of the OR gate 79; thus a pulse on conductor 60 during such an interval will result in the intended application of a pulse to conductor 110 (which in turn will conclude that interval).

While I have disclosed my invention in terms of a particular embodiment thereof, it will be understood that I intend thereby no unnecessary limitations. Modifications in many respects will be suggested by the disclosure to those skilled in the art, and such modifications will not necessarily constitute departures from the spirit of the invention or from its scope, which I undertake to define in the following claims.

I claim:

1. Station-identification apparatus for use in the reception of telephone calls from stations at each of which a respective series, peculiar to that station, of a uniform number *n* of numeral-representing predeterminedly spaced signals extending over a predetermined period of time is repetitively superimposed on the call at an interval of recurrence long relative to said period, comprising A. means for receiving and screening such numeral-representing signals;

B. a group of *n* storing means, connected with said receiving and screening means, for sequentially storing the numerals respectively represented by successive received and screened signals;

C. output means;

D. means, interposed between said storing means and said output means, actuable to cause said output means to read out the numerals then standing stored in said storing means; and E. means, connected with said receiving and screening means, for delivering an actuation command when a received and screened signal has been followed by ($n$—1) received and screened signals within a time span much shorter than said interval of recurrence, said actuable means being connected with said command-delivering means for actuation thereby.

2. The subject matter claimed in claim 1 wherein said element identified as (E) comprises means, connected with said receiving and screening means, for delivering an actuation command when a received and screened signal has been followed by ($n$—1) received and screened signals within a time span of the order of magnitude of said predetermined period.

3. The subject matter claimed in claim 1 wherein said receiving and screening means includes means for withholding from storage any signal which has not persisted for at least a predetermined duration without interruption for more than a much shorter predetermined interval.

4. The subject matter claimed in claim 1 wherein said receiving and screening means includes means for withholding from storage any non-initial signal not preceded by a non-signal interval at least equal to a substantial fraction of the predetermined inter-signal spacing.

5. The subject matter claimed in claim 1 wherein said element identified as (D) includes a group of $n$ storing means respectively connected with the $n$ storing means of said first-recited group and effective, when said element is actuated, to store the numerals then standing stored in the storing means of said first-recited group.

6. The subject matter claimed in claim 5 further including means, effective after the first actuation of said element identified as (D) following a period of quiescence, for inhibiting the further actuation of said element so long as the numerals respectively stored in the $n$ storing means of said first-recited group remain constant.

7. The subject matter claimed in claim 1 further including means, connected with said output means and said command-delivering means, for disabling said output means upon the passage of a predetermined time, long relative to said interval of recurrence, without the delivery of a command by said command-delivering means.

* * * * *